(12) United States Patent
McNutt et al.

(10) Patent No.: US 6,265,454 B1
(45) Date of Patent: Jul. 24, 2001

(54) RUBBER COMPOSITIONS CONTAINING GROUND TIRE RUBBER

(75) Inventors: Jamie J. McNutt, Tallmadge; Michael S. James, Cuyahoga Falls; William J. O'Briskie; William J. Corsaut, both of Uniontown, all of OH (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/384,635

(22) Filed: Aug. 27, 1999

(51) Int. Cl.⁷ ....................................................... C08J 11/04
(52) U.S. Cl. ................ 521/41; 521/40; 521/40.5
(58) Field of Search .................... 524/495, 496; 521/40, 40.5, 41, 41.5

(56) References Cited

U.S. PATENT DOCUMENTS

| | | | |
|---|---|---|---|
| 4,101,463 | * 7/1978 | Morgan et al. ................. 260/2.3 |
| 4,374,573 | 2/1983 | Rouse et al. . | |
| 4,481,335 | * 11/1984 | Stark, Jr. ........................ 525/261 |
| 4,714,201 | 12/1987 | Rouse et al. . | |
| 5,238,194 | 8/1993 | Rouse et al. . | |
| 5,356,939 | * 10/1994 | Burrowes et al. ............... 521/41.5 |
| 5,397,825 | * 3/1995 | Segrest .......................... 524/270 |
| 5,411,215 | 5/1995 | Rouse . | |
| 5,506,274 | * 4/1996 | Brown ........................... 521/41 |
| 5,591,794 | * 1/1997 | Fukumoto et al. ............... 524/447 |
| 5,883,139 | * 3/1999 | Wideman et al. ................ 521/43.5 |
| 5,889,119 | 3/1999 | Coran et al. . | |

FOREIGN PATENT DOCUMENTS

931809 * 7/1999 (EP) .

OTHER PUBLICATIONS

U.S. application No. 09/384,649, Squire et al., filed Aug. 27, 1999.
16 CFR Chapter 1, Section 260—Guides for the Use of Environmental Marketing Claims.
Glossary of Scrap Tire Technology, *Scrap Tire Management Council*, Apr. 1994.

* cited by examiner

Primary Examiner—Edward J. Cain
Assistant Examiner—Katarzyna Wyrozebski-Lee
(74) Attorney, Agent, or Firm—John H. Hornickel; Daniel J. Hudak; Meredith E. Palmer

(57) ABSTRACT

Old, spent or worn tires are recycled by removing non-rubber components such as belts, beads, and fabric, and grinding the remaining cured rubber into fine sized particles. The ground particles generally replace equivalent amounts of rubber and additives in various tire formulated components such as tire treads. Good physical properties of the end product are retained.

18 Claims, No Drawings

RUBBER COMPOSITIONS CONTAINING GROUND TIRE RUBBER

FIELD OF INVENTION

The present invention relates to fine sized ground tire rubber which is substituted as a partial rubber source for a specific tire component such as a tire tread.

BACKGROUND OF THE INVENTION

Heretofore, large particle size ground rubber (10 to 40 U.S. Standard Mesh) has been utilized for many years in various tire components, but with significant losses of physical properties. Ground tire rubber has also been utilized in asphalt.

SUMMARY OF INVENTION

Old, spent, worn, etc. Times with the fabric and metal removed therefrom are shredded. The remaining rubber is ground into fine sized particles of about 90 U.S. Standard Mesh or smaller. The particles, which are cured, are recycled by substituting the same for generally an equivalent removed amount of rubber and additives for a specific tire component.

DETAILED DESCRIPTION

As a replacement source of rubber, scrap, old, or worn tires are shredded and the non-rubber components thereof, such as tire belts, tire beads and fabric ply, are removed. The tires can be from passenger vehicles, buses, preferably trucks, and the like and can be of a bias ply construction or preferably of a radial ply construction. The major rubber components of such tires are generally natural rubber, synthetic isoprene, polybutadiene, styrene-butadiene rubber, halobutyl rubber, and the like. Such cured rubber which contains various additives therein is ground into fine sized particles and recycled by replacing generally an equivalent amount of a rubber otherwise used in the formulation of a tire component rubber. The above tires, of course, contain conventional or suitable amounts of typical additives known to the art such as one or more types of carbon black; curing aids such as sulfur or sulfur containing compounds; various accelerators, such as amines, disulfides, guanidines, thioureas, thiazoles, thiurarris, sulfenamides, dithiocarbamates, and the like. Other additives include silica; silica coupling agents; various oils such as aromatic, naphthenic, or paraffinic; various antioxidants and antiozonants such as various phenylenediamines; various aliphatic acids such as stearic acid; zinc oxide; various waxes such as micro crystalline waxes; various peptizers; and the like. Various fillers can also be utilized such as clay, for example kaolin clay, and the like.

An important aspect of the present invention is that the shredded tire rubber containing various additives therein is ground into fine size particles such as 90 mesh or smaller, desirably 120 or smaller, and preferably 200 U.S. Standard Mesh or smaller. Any rubber grinding method or process can be utilized so long as the rubber is not scorched, degraded, or otherwise damaged during grinding thereof. A particularly preferred method of grinding the rubber is in the presence of water, which keeps the rubber temperature low, as well as extinguishes any possibility of a fire. A more detailed description of such a preferred grinding method is set forth in U.S. Pat. Nos. 4,374,573; 4,714,201; 5,238,194; and 5,411,215, which are hereby fully incorporated by reference. Another method is cryogenically grinding the tire rubber. When cured rubber is recycled according to any of the above methods, and analyzed for chemical composition, a small portion (e.g. about 10%) is ash.

Cured, ground rubber is generally utilized in a slightly larger amount to replace, substitute, or compensate for a partial amount of uncured rubber-additive tire formulation. That is, if a specific tire component formulation, contains a total of 100 parts by weight of uncured rubber, and it is desired to add, for example, 30 parts by weight of ground rubber, a slightly smaller amount by weight, for example, about 27 parts by weight of the uncured tire formulation is deleted. Of the 27 parts deleted, 15 parts are rubber, 9 parts are filler (e.g. Carbon Black, Silica), and 3 parts are softener (e.g. oil). In other words, while the preferred amount of rubber and additives replaced, compensated or substituted is about 90% by weight of the recycled rubber added, the actual added recycled amount can generally range from about 40% to about 150%, desirably from about 60% to about 125%, and more desirably from about 80% to about 100%. Although different tire sources or a specific component of a tire will yield different amounts of basically three groups of compounds, that is rubber, fillers such as carbon black, silica, etc. and softeners such as oils, stearic acid, waxes, and the like, the amount of the replacement fine sized ground rubber cured particles containing additives therein is generally within the above noted ranges.

The actual amount of the recycled ground tire rubber particles utilized in any tire component rubber-additive formulation is generally up to or from about 2 to about 50 parts by weight, desirably from about 5 to about 30 parts by weight, and preferably from about 7 to about 15 or 20 parts by weight for every 100 total parts by weight of the specific tire component rubber-additive formulation including the ground rubber-additive particles. While generally the ground tire rubber particles can be utilized in formulating any component of a tire, desired tire components include the side wall, the innerliner, the bead filler, with the tire tread being especially preferred.

The tire component formulation can contain conventional or typical amounts of conventional or typical rubbers and such formulations are generally known to the art. While the type and amounts of rubbers and additives can vary from component to component, they all generally comprise various rubbers such as natural rubber, synthetic isoprene, styrene-butadiene rubber, polybutyldiene, halobutyl rubber, and the like. Such rubbers also include emulsion rubbers such as ESBR 1502, 1712, 1721, and the like, as well as solution SBR such as the various Duradene rubbers made by the Bridgestone/Firestone, Inc. Various carbon blacks can be utilized such as the N 100, N 200, or N 300 series. Various types of oil can be utilized such as aromatic, naphthenic, paraffinic, and the like. Various antiozonates can be utilized, as well as various antioxidants such as 6 PPD, 1 PPD, and the like, along with various waxes such as microcrystalline waxes. Still other additives include various aliphatic acids such as stearic acids; zinc oxide; various peptizers; and the like. Curing aids include sulfur or sulfur containing compounds and various accelerators include amines, disulfides, guanidines, thioureas, thiazoles, thiurams, sulfenamides, dithiocarbamates, and the like with specific examples including TBBS (N-Tert-Butyl-Benzothiazolesulfenamide), CBS (Cyclohexyl Benzothiazolesulfenamide), DPG (Diphenylguanidine), and TMTD (Tetramethylthiuram Disulfide). Silica as well as silica coupling agents can also be utilized as well as various fillers such as clay.

The ground cured tire rubber particles can be blended or mixed with a tire component rubber additive or formulation by any conventional or common method. Suitable mixing methods include blending in a Banbury, blending on a two-roll mill, and the like. Once the above noted ground rubber and conventional rubber-additive formulation have been blended to form a tire component composition, they can be assembled into a specific tire component in accordance with conventional techniques, methods, and the like well known to the art and to the literature. Thus, the blended rubber composite can be applied to a tire carcass in the form of a sheet to eventually form a tire tread, placed in a tire curing mold and cured in a conventional manner at typical times and temperatures.

The present invention will be better understood by reference to the following examples, which serve to illustrate but not to limit the invention.

The formulations set forth in Tables I through VI containing 200 mesh ground rubber or a mesh size as otherwise indicated were generally prepared in the following manner. A master batch was made by adding all of the polymers or rubber, fillers such as carbon black, ground rubber particles, oil, optionally silica, zinc oxide, and stearic acid to a Banbury. These ingredients were mixed from about 1.5 to about 2.5 minutes and dropped at a temperature of from about 270° F. to about 350° F. The stock was aged for a minimum of four (4) hours before the next or final stage. An optional re-mill can be utilized.

In the final stage, all the antioxidants, accelerators, sulfur, and the master batch were added to a Banbury. The mix time was approximately from about 60 to 80 seconds and dropped at a temperature of from about 190° F. to about 220° F.

Various formulations for a tire tread are set forth in Tables I through V, wherein the amounts listed are parts by weight were prepared in the above manner and tested.

TABLE I

|  |  | Control | Ex. 1 |
|---|---|---|---|
| Solution SBR |  | 80.00 | 67.50 |
| Natural Rubber |  | 20.00 | 17.50 |
| Ground Rubber |  | 0.00 | 30.00 |
| Carbon Black |  | 65.00 | 56.00 |
| Oil |  | 6.75 | 3.75 |
| Antioxidants |  | 2.00 | 2.00 |
| Zinc Oxide |  | 2.00 | 2.00 |
| Stearic Acid |  | 2.00 | 2.00 |
| Accelerators |  | 1.40 | 1.40 |
| Sulfur |  | 1.70 | 1.70 |
| Physical Properties |  |  |  |
| Stress/Strain | M 100% RT (MPa) | 2.07 | 2.13 |
|  | Tensile RT (MPa) | 21.15 | 20.65 |
|  | Elongation % | 390.50 | 399.00 |
| Ring Tear | 100° C. PSI | 322.00 | 333.00 |
| Zwick Rebound | RT | 38.00 | 38.60 |

TABLE II

|  | Control | Ex. 2 | Ex. 3 | Ex. 4 |
|---|---|---|---|---|
| Emulsion SBR | 36.36 | 34.96 | 33.56 | 32.20 |
| Solution SBR | 43.64 | 41.96 | 40.28 | 38.60 |
| Natural Rubber | 20.00 | 19.23 | 18.46 | 17.69 |
| Ground Rubber | 0.00 | 10.00 | 20.00 | 30.00 |
| Carbon Black | 42.50 | 39.50 | 36.50 | 33.50 |
| Silica | 15.00 | 15.00 | 15.00 | 15.00 |
| Oil | 8.00 | 7.00 | 6.00 | 5.00 |
| Antioxidants | 3.00 | 3.00 | 3.00 | 3.00 |
| Zinc Oxide | 2.00 | 2.00 | 2.00 | 2.00 |

TABLE II-continued

|  |  | | | | |
|---|---|---|---|---|---|
| Stearic Acid |  | 1.00 | 1.00 | 1.00 | 1.00 |
| Accelerators |  | 2.50 | 2.50 | 2.50 | 2.50 |
| Sulfur |  | 2.00 | 2.00 | 2.00 | 2.00 |
| Physical Properties |  |  |  |  |  |
| Stress/Strain | M 100% RT (MPa) | 3.31 | 3.20 | 3.24 | 3.14 |
|  | Tensile RT (MPa) | 18.65 | 17.99 | 20.88 | 19.86 |
|  | Elongation % | 402.60 | 385.80 | 442.80 | 426.90 |
| Ring Tear | 100° C. PSI | 395.40 | 364.10 | 328.70 | 335.90 |
| Zwick Rebound | RT | 31.50 | 32.00 | 33.10 | 32.80 |

TABLE III

|  |  | Control | Ex. 8 | Ex. 9 | Ex. 10 |
|---|---|---|---|---|---|
| Solution SBR |  | 77.05 | 73.55 | 70.05 | 66.55 |
| Butadiene Rubber |  | 33.00 | 31.50 | 30.00 | 28.50 |
| Ground Rubber |  | 0.00 | 10.00 | 20.00 | 30.00 |
| Carbon Black |  | 36.00 | 33.00 | 30.00 | 27.00 |
| Silica |  | 35.00 | 35.00 | 35.00 | 35.00 |
| Oil |  | 31.20 | 30.20 | 29.20 | 28.20 |
| Antioxidants |  | 2.45 | 2.45 | 2.45 | 2.45 |
| Zinc Oxide |  | 1.70 | 1.70 | 1.70 | 1.70 |
| Stearic Acid |  | 1.00 | 1.00 | 1.00 | 1.00 |
| Accelerators |  | 2.40 | 2.40 | 2.40 | 2.40 |
| Sulfur |  | 2.00 | 2.00 | 2.00 | 2.00 |
| Physical Properties |  |  |  |  |  |
| Stress/Strain | M 100% RT (MPa) | 1.37 | 1.42 | 1.44 | 1.45 |
|  | Tensile RT (MPa) | 16.22 | 16.54 | 16.49 | 16.45 |
|  | Elongation % | 507.00 | 600.80 | 593.30 | 586.80 |
| Ring Tear | 100° C. PSI | 323.00 | 302.00 | 316.00 | 289.00 |
| Zwick Rebound | RT | 39.20 | 38.80 | 38.90 | 39.00 |

TABLE IV

|  | Control | Ex. 11 | Ex. 12 | Ex. 13 | Ex. 14 | Ex. 15 |
|---|---|---|---|---|---|---|
| Solution SBR | 50.00 | 47.72 | 45.43 | 43.15 | 40.86 | 38.58 |
| Solution SBR | 34.40 | 32.83 | 31.26 | 29.69 | 28.12 | 26.55 |
| Natural Rubber | 25.00 | 23.86 | 22.71 | 21.57 | 20.42 | 19.28 |
| Ground Rubber | 0.00 | 10.00 | 20.00 | 30.00 | 40.00 | 50.00 |
| Carbon Black | 32.50 | 29.50 | 26.50 | 23.50 | 20.50 | 17.50 |
| Silica | 36.00 | 36.00 | 36.00 | 36.00 | 36.00 | 36.00 |
| Oil | 13.00 | 12.00 | 11.00 | 10.00 | 9.00 | 8.00 |
| Antioxidants | 2.00 | 2.00 | 2.00 | 2.00 | 2.00 | 2.00 |
| Zinc Oxide | 3.00 | 3.00 | 3.00 | 3.00 | 3.00 | 3.00 |
| Stearic Acid | 1.50 | 1.50 | 1.50 | 1.50 | 1.50 | 1.50 |
| Accelerators | 2.10 | 2.10 | 2.10 | 2.10 | 2.10 | 2.10 |
| Sulfur | 1.70 | 1.70 | 1.70 | 1.70 | 1.70 | 1.70 |
| Physical Properties |  |  |  |  |  |  |
| Stress/Strain |  |  |  |  |  |  |
| M 100% RT (MPa) | 2.03 | 2.02 | 1.98 | 1.94 | 1.90 | 1.90 |
| Tensile RT (MPa) | 18.48 | 18.18 | 17.34 | 18.17 | 17.41 | 18.28 |
| Elongation % | 438.60 | 446.70 | 434.10 | 461.00 | 449.90 | 497.70 |
| Ring Tear |  |  |  |  |  |  |
| 100° C. PSI | 286.00 | 254.00 | 249.60 | 279.80 | 268.70 | 238.60 |
| Zwick Rebound |  |  |  |  |  |  |
| RT | 41.20 | 41.90 | 42.10 | 43.00 | 43.30 | 43.80 |

As apparent from the data in all of the above four tables, retention of physical properties using the finely ground reclaimed tire rubber was quite good. In fact, in many instances, physical properties were actually improved.

TABLE V

|  | Control | Ex. 11 | Ex. 12 | Control 2 | Control 3 |
|---|---|---|---|---|---|
| Solution SBR | 80.00 | 67.46 | 67.46 | 67.46 | 67.46 |
| Natural Rubber | 20.00 | 17.54 | 17.54 | 17.54 | 17.54 |
| 200 Mesh Ground Rubber | — | 30.00 | — | — | — |
| 120 Mesh Ground Rubber | — | — | 30.00 | — | — |
| 80 Mesh Ground Rubber | — | — | — | 30.00 | — |
| 60 Mesh Ground Rubber | — | — | — | — | 30.00 |
| Carbon Black | 65.00 | 56.00 | 56.00 | 56.00 | 56.00 |
| Oil | 6.75 | 3.75 | 3.75 | 3.75 | 3.75 |
| Antioxidants | 2.00 | 2.00 | 2.00 | 2.00 | 2.00 |
| Zinc Oxide | 2.00 | 2.00 | 2.00 | 2.00 | 2.00 |
| Stearic Acid | 2.00 | 2.00 | 2.00 | 2.00 | 2.00 |
| Accelerators | 1.40 | 1.40 | 1.40 | 1.40 | 1.40 |
| Sulfur | 1.70 | 1.70 | 1.70 | 1.70 | 1.70 |
| Physical Properties | | | | | |
| Stress/Strain | | | | | |
| M 100% RT (MPa) | 2.10 | 2.13 | 2.03 | 2.03 | 2.07 |
| Tensile RT (MPa) | 21.15 | 19.50 | 20.53 | 20.72 | 19.44 |
| Elongation % | 532.40 | 509.60 | 525.40 | 478.30 | 483.40 |
| Ring Tear | | | | | |
| 100° C. PSI | 364.40 | 374.50 | 333.40 | 281.70 | 282.20 |
| Zwick | | | | | |
| Rebound | | | | | |
| RT | 38.00 | 38.00 | 38.30 | 36.40 | 34.00 |

As apparent from Table V, large size ground rubber particles (Control 2 and 3) had poor physical properties such as ring tear and rebound whereas Examples 11 and 12 containing 200 Mesh and 120 Mesh ground rubber respectively had good properties.

While in accordance with the patent statutes, the best mode and preferred embodiment have been set forth, the scope of the invention is not limited thereto, but rather by the scope of the attached claims.

What is claimed is:

1. A tire component composition, comprising:
   a tire component rubber formulation, said formulation comprising rubber and additives and having blended therein up to about 50 parts by weight of recycled cured ground tire rubber particles based upon 100 total parts by weight of said tire component rubber formulation and said recycled cured ground rubber particles, wherein said recycled cured ground tire rubber particles replace a partial amount of said tire component rubber formulation, and wherein said recycled cured ground tire rubber particles have a size of 90 U.S. Standard Mesh or smaller.

2. A tire component composition according to claim 1, wherein the amount of said recycled cured ground tire rubber particles is from about 2 to about 50 parts by weight for every 100 total parts by weight of said tire component rubber formulation and said recycled cured ground tire rubber particles.

3. A tire component composition according to claim 2, wherein said recycled cured ground tire rubber particles have a size of 120 U.S. Standard Mesh or smaller.

4. A tire component composition according to claim 3, wherein said recycled cured ground tire rubber particles have a size of 200 U.S. Standard Mesh or smaller, and wherein the amount of said recycled cured ground tire rubber particles is from about 5 parts to about 30 parts by weight for every 100 total parts by weight of said tire component rubber formulation and said recycled cured ground tire rubber particles.

5. A tire component composition according to claim 4, wherein the amount of said recycled cured ground tire rubber particles is from about 7 parts by weight to about 20 parts by weight for every 100 total parts by weight of said tire component rubber formulation and said recycled cured ground tire rubber particles.

6. A tire component composition according to claim 1, wherein the amount of said recycled cured ground tire rubber particles is from about 40% to about 150% by weight for every one part by weight of said tire component rubber formulation which is replaced.

7. A tire component composition according to claim 4, wherein the amount of said recycled cured ground tire rubber particles is from about 60% to about 125% by weight for every one part by weight of said tire component rubber formulation which is replaced.

8. A tire component composition according to claim 1, wherein said tire component composition is a tire tread.

9. A tire component composition according to claim 5, wherein said tire component composition is a tire tread.

10. A tire component composition according to claim 1, wherein said tire component composition is cured.

11. A tire component composition according to claim 4, wherein said tire component composition is cured.

12. A tire component composition according to claim 6, wherein said tire component composition is cured.

13. A tire component composition according to claim 9, wherein said tire component composition is cured.

14. A method for recycling cured tire rubber, comprising the steps of:
   blending recycled cured ground tire rubber particles with a tire component rubber formulation, said formulation comprising said rubber and additives, and said recycled cured ground tire rubber particles having a size of 90 U.S. Standard Mesh or smaller, wherein the amount of said recycled cured ground tire rubber particles is from about 2 to about 50 parts by weight based upon 100 total parts by weight of said tire component rubber formulation and said recycled cured ground tire rubber particles, and wherein said recycled cured ground tire rubber particles replace a partial amount of said tire component rubber formulation.

15. A method according to claim 14, wherein the amount of said recycled cured ground tire rubber particles is from about 5 to about 30 parts by weight, and wherein the size of said recycled cured ground tire rubber particles is 200 U.S. Standard Mesh or smaller.

16. A method according to claim 14, including forming a tire component and curing said tire component.

17. A method according to claim 15, including forming a tire component and curing said tire component.

18. A method according to claim 14, wherein the amount of said recycled cured ground tire rubber particles is from about 60% to about 120% by weight for every one part by weight of said tire component rubber formulation which is replaced.

* * * * *